United States Patent [19]
Santavuori et al.

[11] Patent Number: 5,806,582
[45] Date of Patent: Sep. 15, 1998

[54] METHOD AND ARRANGEMENT FOR CONTROLLING HEAT TRANSFER IN VENTILATION APPARATUS OR AIR CONDITIONING APPARATUS

[75] Inventors: Esko Tapio Santavuori, Turku; Ingmar Erik Rolin, Espoo; Seppo Juhani Leskinen, Västerskog, all of Finland

[73] Assignee: ABB Installaatiot oy, Helsinki, Finland

[21] Appl. No.: 571,900

[22] PCT Filed: Jul. 5, 1994

[86] PCT No.: PCT/FI94/00310

§ 371 Date: Apr. 30, 1996

§ 102(e) Date: Apr. 30, 1996

[87] PCT Pub. No.: WO95/02157

PCT Pub. Date: Jan. 19, 1995

[30] Foreign Application Priority Data

Jul. 7, 1993 [FI] Finland .................................. 933123

[51] Int. Cl.$^6$ ............................... F25B 29/00; F24F 3/00; F24F 11/00
[52] U.S. Cl. ......................... 165/11.1; 165/54; 165/295; 165/293; 165/66; 165/252; 165/104.31; 165/909; 62/95
[58] Field of Search ............................... 165/11.1, 54, 66, 165/295, 293, 252, 104.3, 909; 62/95

[56] References Cited

U.S. PATENT DOCUMENTS 5,573,058 11/1996 Rolin .................................. 165/104.31

FOREIGN PATENT DOCUMENTS

| 3311561 A1 | 10/1984 | Germany . |
| 420 124 | 9/1981 | Sweden . |
| 82003542 | 7/1983 | Sweden . |
| 83069211 | 6/1985 | Sweden . |
| 1751614 | 7/1992 | U.S.S.R. . |
| WO93/10403 | 5/1993 | WIPO . |

*Primary Examiner*—John K. Ford
*Attorney, Agent, or Firm*—Fitch, Even, Tabin & Flannery

[57] ABSTRACT

A method and an arrangement for controlling heat transfer in a ventilation apparatus or an air conditioning apparatus, in which heat contained in exhaust air is recovered into supply air by means of a heat transfer circuit having fluid circulation. Additional heating or additional cooling energy is supplied to the heat transfer circuit when the heat transfer is insufficient for maintaining a desired temperature of the supply air. To optimize the heat recovery, the supply of additional heating or cooling energy is minimized by measuring the temperatures and fluid flows of the heat transfer fluid and of the additional energy.

13 Claims, 2 Drawing Sheets

METHOD AND ARRANGEMENT FOR CONTROLLING HEAT TRANSFER IN VENTILATION APPARATUS OR AIR CONDITIONING APPARATUS

BACKGROUND OF THE INVENTION

The present invention relates to a method for controlling heat transfer in a ventilation apparatus or an air conditioning apparatus, according to which method heat contained in exhaust air is recovered into supply air by means of a heat transfer circuit based on fluid circulation, additional heating or additional cooling energy is supplied to the heat transfer circuit when the heat transfer is insufficient for maintaining a desired temperature of the supply air, and the supply of additional heating or additional cooling energy is controlled to achieve a desired temperature of the supply air.

In air conditioning systems, recovery of heat from outlet air exhausted from a building, i.e. exhaust air, into inlet air supplied to the building from outdoors, i.e. supply air, has become common. Heat exchangers operating on a number of different principles have been designed for heat recovery. A very common type is a plate heat exchanger in which heat is transferred through a wall from the exhaust air to the supply air as the exhaust and supply air flow in adjacent passages separated by plate walls. Almost as common is what is known as the regenerative heat exchanger in which the heat in the exhaust air is bound to a solid heat carrier that is brought to the supply air flow, whereupon said carrier gives up the bound heat. Most commonly this solid carrier is built as a rotatable drum through one half of which the exhaust air flows and through the other half of which the supply air flows.

Optimization of operation does not constitute a problem with either of these heat exchanger types. Their power can only be controlled with partial load, i.e. when the heat flow that can be recovered from the exhaust air exceeds the heat flow needed for heating the supply air. The power of plate heat exchangers is most often cut down by conducting part of the supply and/or exhaust air flow past the heat exchanger. Also regenerative recovery can be produced by means of bypass control, yet in most by controlling the speed of rotation of the drum. When the speed of rotation decreases, the heat output is reduced. Neither of these heat exchanger types can be controlled after the heating demand of the supply air exceeds the heat flow recovered from the exhaust air. The temperature control of the supply air is performed by adjusting the power of a separate after-heating radiator.

On the other hand, in a fluid circulation system consisting of separate heat exchangers in the supply air flow and the exhaust air flow and a pipeline system in between, wherein a circulation pump circulates a heat carrier fluid in a closed circuit, control is necessary to optimize the operation. Also in this case, control of the final temperature of the supply air is performed by adjusting the power of a separate after-heating radiator.

This control method is simple and, furthermore, a considerable part of the heat content in the exhaust air can be transferred to the supply air when the temperature changes of the supply and exhaust air are equal, in other words, in terms of the denotations of FIG. 1, $T_{e1}-T_{e2}=\Delta T_e=\Delta T_s=T_{s2}-T_{s1}$. In that connection, the temperature efficiency, defined as follows $$\eta = \frac{T_{s2}-T_{s1}}{T_{e1}-T_{s1}},$$

is adequate in most practical cases.

In practice, the control is performed by conducting part of the fluid flow circulated by the pump in a closed pipeline system past the heat exchanger for supply air or the heat exchanger for exhaust air by means of a valve.

It has been possible to demonstrate by way of calculation examples that the maximum value of temperature efficiency is actually achieved only at one point of the control range, especially when phase changes, usually condensation of water, occur. Yet by this simple rule-of-thumb the operation can be controlled and assumes the correct direction; therefore this principle is generally followed in designing the control logic.

However, the method is attended by essential drawbacks. In fact, this method controls the fluid flow passing through the supply air heat exchanger in response to the temperatures of the supply air flow and exhaust air flow with no information on the result of the control, i.e. on what the fluid flow passing through the supply air heat exchanger is and what effect the change in flow has on the operation of the heat exchanger. It is possible that the heat transfer characteristics of the heat exchanger are markedly deteriorated when the fluid flow changes. In fact, a better temperature efficiency would be achieved with such a flow through the heat exchanger wherein the condition $\Delta T_e=\Delta T_s$ is not valid.

In fact, the condition $\Delta T_e=\Delta T_s$ requires that
a) the heat transfer characteristics of the supply and exhaust air heat exchangers are the same,
b) the exhaust and supply air flows are equal,
c) the heat transfer characteristics of the supply air heat exchanger do not change even though the fluid flow passing therethrough changes.

Condition a) is very difficult to satisfy in practice, and no heat exchanger satisfying condition c) exists.

Further, the change in the viscosity of the heat transfer fluid with variations in outdoor temperature and thereby in the mean temperature of said heat transfer fluid and also some other lesser factors should be taken into account.

The consequence of all this is that even though the heat recovery in the design conditions attains the design values, the average temperature efficiency achieved over a longer period will generally fall clearly below, often as much as 10% below, that of the design conditions.

Finnish Patent Application 915511 concerns a heat transfer arrangement for air conditioning, wherein heat recovery, additional heating and additional cooling are incorporated in a single heat transfer circuit. In this arrangement, additional heating or cooling energy is supplied to the inlet duct leading to the supply air heat exchanger by means of a pilot valve.

If the above rule-of-thumb $\Delta T_s=\Delta T_e$ is applied to such a system, the heat recovery is a long way off the optimum operating efficiency, especially when the supply of additional energy is at its highest. If the supplied amount of additional energy is controlled according to the desired supply air temperature, as is the case in conventional systems, it is possible that the system remains far from reaching the optimum point of heat recovery, in other words, energy goes to waste if the condition $\Delta T_e=\Delta T_s$ is complied with.

SUMMARY OF THE INVENTION

It is an object of the present invention to provide a controlling method avoiding the above drawbacks. This object is achieved with the method of the invention, which is characterized by minimizing the supply of additional heating or additional cooling energy by measuring the temperatures and fluid flows of the heat transfer fluid and of the additional energy.

With the controlling method of the invention, the temperature of the supply air can be closely controlled, but nevertheless the recovery of heat and in summer the recovery of cold can be made to operate with maximum efficiency. The use of additional energy in the system can be controlled; limitations and possibilities for sliding can be built in the operations of the arrangement in a simple manner. By this means, maximum values for the use of additional heating or cooling energy in exceptional situations can be determined. These are of particular importance since energy tariffs, connection charges and/or equipment dimensions are determined on the basis of the maximum values.

The invention is based on the simple realization that heat recovery is optimal when the amount of additional energy supplied to the return flow circuit is at the minimum value required by the operating conditions. In fact, instead of optimizing the operation of the heat recovery, an attempt is made to minimize the supply of additional energy. In practice, this is effected in such a way that the fluid flow circulating in the heat recovery circuit and its temperatures prior to and subsequent to both heat exchangers are measured. When control algorithms are formed for the ratios of these values by methods known per se, it is further realized that the conventional bypass control of the fluid flow by means of a valve will not lead to an optimum result or to good control accuracy. By controlling the total fluid flow circulating in the heat transfer circuit, the operation can be substantially improved. The control can be effected by methods known per se by stepless control of the speed of rotation of the circulation pump or by means of a two-speed motor, by throttling the flow with a valve, etc., as bypass control from the delivery side of the pump to the suction side thereof, or as a combination of these or other control methods known per se.

Formation of the control algorithms is essentially facilitated and their accuracy improved if, in addition to the fluid flows and their temperatures, air temperatures $T_{e1}$, $T_{e2}$, $T_{s1}$ and $T_{s2}$ and the additional energy flow supplied to the system, i.e. the fluid flow and its inlet and outlet temperatures, are measured.

This is of particular advantage when phase changes, usually condensation of steam and in rare cases evaporation of water, occur in the air flows, bringing about drastic changes in the characteristics of the heat exchanger in which the phase change takes place and in the heat flow through said heat exchanger. The phenomenon is immediately and clearly to be seen in the energy flows but will easily go unnoticed in air temperature measurement. It is relatively easy to form an algorithm based on comparison of the measured variables, enabling correction of the operation to be optimal.

It is to be emphasized, however, that air temperatures, for example, are only auxiliary variables that are not adjusted. In the system of the invention the temperature of the supply air, for example, which is normally adjusted is merely a boundary condition setting limitations on the control of the energy flows. The supply air temperature can certainly also be controlled, but this is effected for example in response to the room temperature and only entails a change in one of the boundary conditions in regard to the control and optimization of the energy flows.

The basic concept is thus to minimize the use of energy by measuring the parameters influencing said use and by changing them in accordance with the control algorithms, in other words, the fluid flows and their temperatures and ratios are controlled. Herein the control algorithms are actually based on the ratios of enthalpic changes.

By applying this basic concept, additional algorithms, limitations and operations that are not included in conventional control logic can easily be implemented in the control logic of the present system. For example in systems with variable air flow, unnecessary dehumidification and waste of the cooling efficiency easily takes place when the temperature of supply air is relatively low and the moisture content is high, e.g. $t_u=22°$ C., $\phi=80\%$, which may be the case especially late in summer. In that situation, conventional control logic controls the air conditioning apparatus in order to reduce the power consumption of the fan, for example in such a way that the temperature of the supply air is 16° C. and the air flow is 60% of the nominal air flow. Quantities to be measured thus include the volumetric flow V and the initial and final temperatures $t_{sa}$ and $t_{s1}$ of the supply air.

Let us look at the phase change of air in terms of an xh-diagram, FIG. 3. In the diagram, the supply air is at point A where temperature $t_{sA}=22°$ C.

moisture content $X_A=0.013$ kg $H_2O$/kg of dry air enthalpy $h_A=55$ kJ/kg of dry air air flow $V_A=0.6\ V_o$ ($V_o=100\%$ air flow).

When the supply air is cooled, it first cools dry from point A to point B in FIG. 3. At this point, the temperature is 18° C., and the air is at its dew point, i.e., the relative humidity is 100%. When cooling is continued, moisture starts condensing from the air, i.e. the air moisture content decreases and heat is released. In FIG. 3, the air undergoes a phase change from point B to point C, at which temperature $t_{sC}=16°$ C.

moisture content $X_C=0.0115$ kg $H_2O$/kg of dry air enthalpy $h_C=46$ kJ/kg of dry air air flow $V_C=0.6\ V_o$.

Let us assume that the heat load of the air conditioned room is such that the air in the room is heated by 8° C., i.e. to 24° C., from point C to point D in FIG. 3.

The required cooling power can be calculated from the formula $$\phi_1 = \zeta \cdot V_A \cdot (h_A - h_C) = \zeta \cdot 0.6\ V_o (55-46) = 5.4 \zeta V_o.$$

The power available for the cooling of the room is obtained from the formula $$\phi_2 = \zeta \cdot c \cdot V_C \cdot (t_{sD} - T_{sC}) = \zeta \cdot c \cdot 0.6 V_o (24-16) = 4.8 \zeta c V_o.$$

In the formula, c is the specific heat kJ/kg ° C. of the air.

Upon closer examination of the phase change A→B→C, it is to be seen that cooling from point A to point B, i.e. the temperature difference $\Delta t=22-18=4°$ C. requires a power $\Delta h=55-51=4$ kJ/kg. On the other hand, cooling from point B to point C, i.e. the temperature difference $\Delta t=18-16=2°$ C. requires a power $\Delta h=51-46=5$ kJ/kg. This is due to the heat released by steam condensed between points B and C. Fully superfluous dehumidification thus consumes as much power as the lowering of the temperature.

The arrangement of the invention is able to find the energy minimum even in such a case. When energy supplied to the arrangement is measured for example by measuring the fluid flow supplied to the arrangement and its inlet and return temperatures, a control unit can be programmed on the basis of the measured signals to calculate the cooling power used from the formula $$\phi_3 = \dot{m}_n \cdot c_n (t_{n2} - t_{n1}), \text{ where}$$

$\dot{m}_n$ = mass flow of fluid, kg/s $c_n$ = specific heat of fluid, kJ/kg °C.

$t_{n1}, t_{n2}$ = inlet and return temperatures of fluid, °C.

The value obtained is actually the same as the value $\phi_1$ calculated above. This value is compared with the power consumption corresponding to dry cooling, which is calculated by the control unit on the basis of the measured supply air flow and the initial and final temperatures of the supply air from the formula $$\phi_4 = \zeta \cdot c \cdot V_C (t_{sA} - t_{sC}) = \zeta \cdot c \cdot 0.6 V_o (22-16) = 3.6 \zeta C v_o.$$

When the control unit detects that $\phi_3 = \phi_1 = 5.4 \zeta V_o$ is greater than $\phi_4 = 3.6 \zeta V_o$, it moves to a control block where the final temperature of the air is raised and the volumetric flow is simultaneously increased for example in such a way that a 1° C. temperature gradient corresponds to a 10% increase in the air flow. When the control has reached the final temperature 18 C., it finds that $\phi_4 = \phi_2$, in which situation no dehumidification is performed, and discontinues the control. The air flow can be controlled to be correct, or the control unit can calculate it from the formula $$\zeta \cdot c \cdot V_C (t_{sD} - t_{sC}) = V_B (t_{sE} - t_{sE}) \cdot \zeta \cdot C, \text{ i.e.}$$

$$V_B = V_C t_{sO} - t_{sC} t_{sE} - t_{sB} = 0.6 V_o 24 - 16 \ 24 - 18 = 0.8 V_o.$$

In such a case, the cooling power consumption of the system is as follows:

$$\phi_5 = \zeta \cdot C \cdot 0.8 V_o (24-18) = 4.8 \zeta C V_o.$$

It is seen that optimized in this manner, the arrangement consumes slightly more than 10% less cooling power than arrangements controlled by prior art controlling methods, i.e. $\phi_5/\phi_1 = 4.8/5.4 = 0.89$.

In the above, the control logic has been set forth as complete calculation formulae for the sake of clarity. In reality, the majority of the control terms are obtained from the program memory as constant terms (e.g. $\zeta c \ V_o$), controlled variables, etc. Complete calculated matrices or control curves may be employed instead of measured variables (e.g. $V_i = V_i (t_{sA})$), etc.

In practice, the final temperature of the air is raised by restricting the mass flow $\dot{m}$ of the additional cooling fluid supplied to the recycling fluid circuit (formula for $\phi_3$ above), as a result of which the temperature in the recycling fluid circuit increases, as a result of which the final temperature of the supply air increases, as a result of which the supply air flow increases, and so on. As will be seen, these correlations are rather complex and are impossible to set out briefly except by way of principle.

What is essential, however, is that without measuring and defining the energy flows, optimization is not possible in the exemplary case.

Such logic can also be built in other than fluid circulation arrangements. However, energy measurement does not come by itself, but must be separately built in the heating and cooling circuits, which will easily have the result that the savings achieved are not sufficient to pay off the additional investments.

Many other operations can be accommodated "free of cost" as software in modern control units. Peak power limitation, reports on energy consumption, evaluation of melting need and control of melting, etc., do not require any substantial additional equipment.

The invention also relates to a control arrangement for implementing the method of the invention.

BRIEF DESCRIPTION OF THE DRAWINGS

In the following the invention will be set forth in greater detail with reference to the accompanying drawing, in which.

DESCRIPTION

Figure 1:
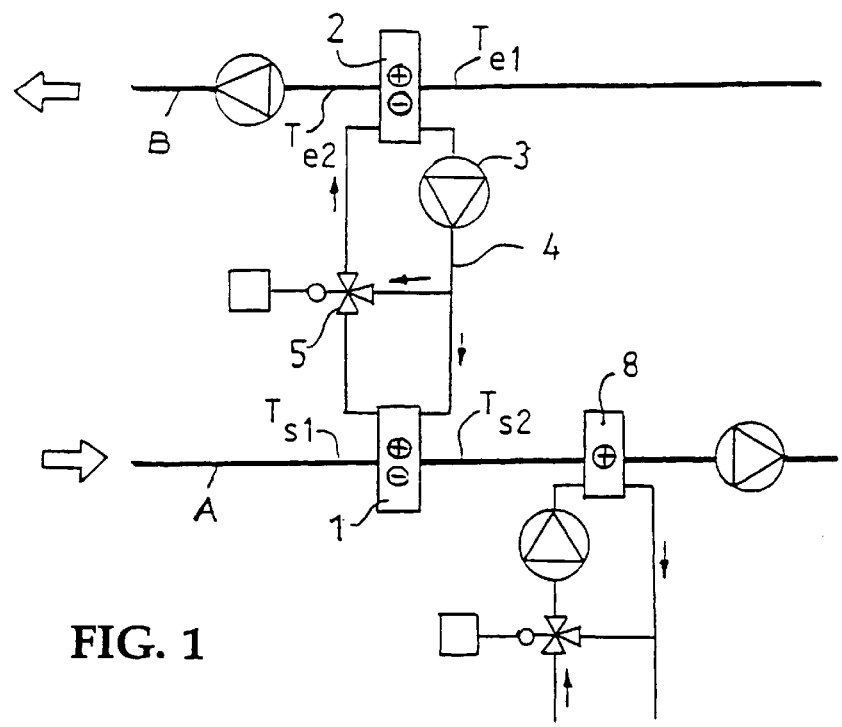
FIG. 1 is a schematic representation of a prior art control arrangement in an air conditioning apparatus.

The prior art control arrangement shown in FIG. 1 has separate heat exchangers 1 and 2 for supply air A and exhaust air B and a heat transfer pipeline system 4 therebetween, including a pump 3 for circulating the heat transfer fluid in a closed circuit. The pipeline system incorporates a valve 5 for conducting part of the fluid flow past heat exchanger 1 or heat exchanger 2. For controlling the final temperature of supply air, an after-heating radiator 8 is provided in the supply air flow.

Figure 2:
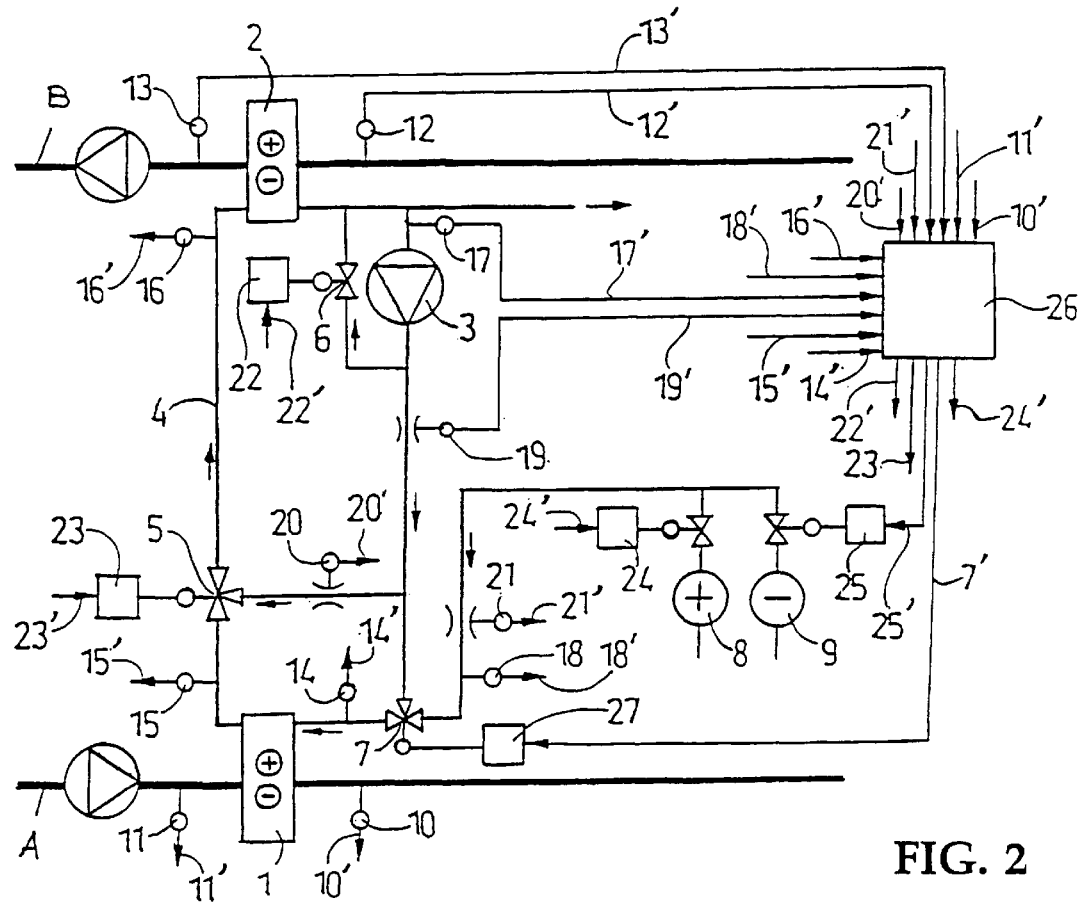
FIG. 2 shows one preferred embodiment of the control arrangement of the invention.
Figure 3:
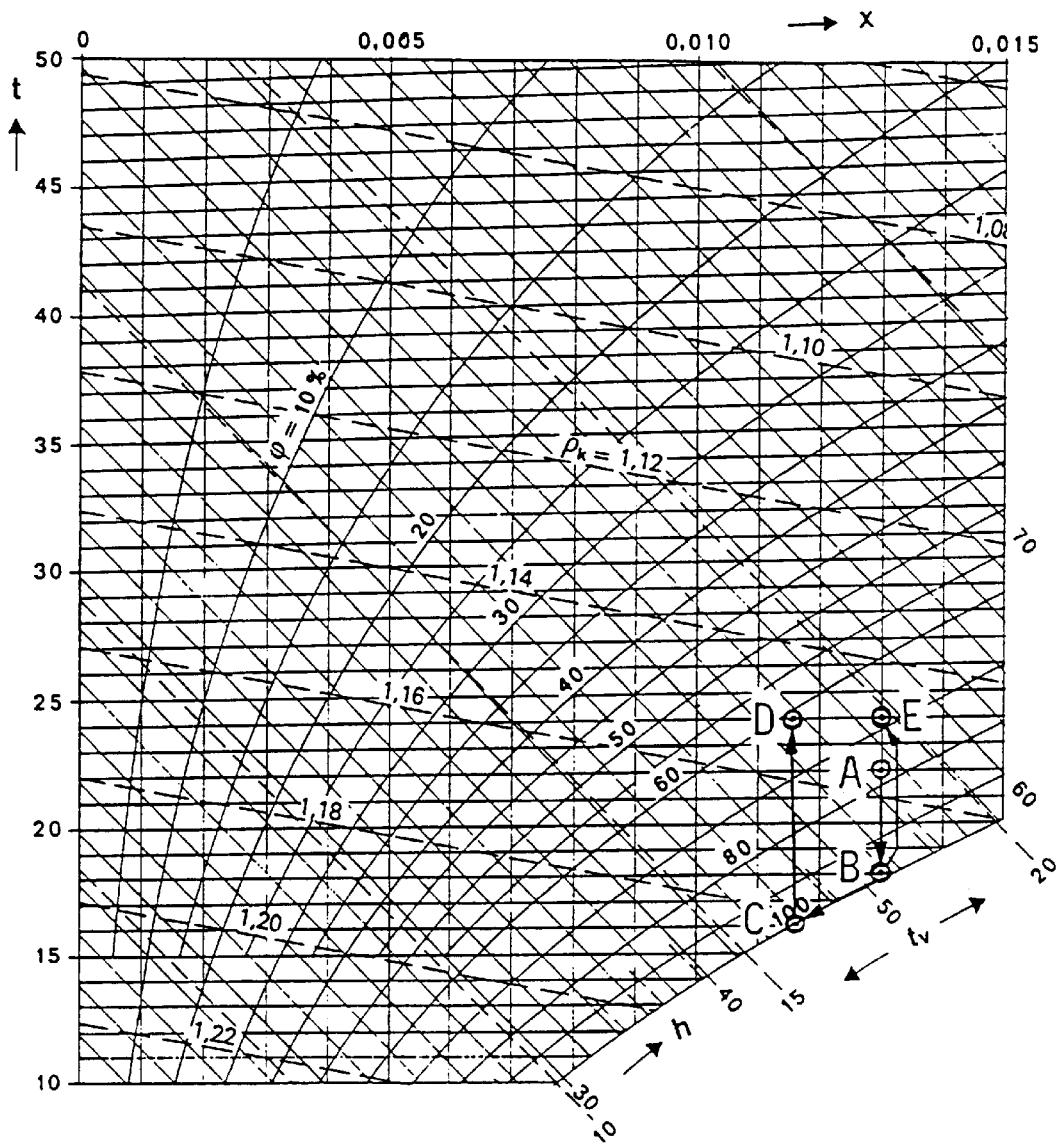
FIG. 3 is a diagram illustrating the phase change of air.

FIG. 2 shows a control diagram that is nearly ideal as regards use of energy, for an air conditioning apparatus according to Finnish Patent Application 915511.

In the control arrangement shown in FIG. 2, the same references have been used for corresponding parts. The inlet duct of the heat transfer pipeline system 4 which leads to the heat exchanger 1 is connected by means of a valve 7 to a heat source 8 and a cooling source 9. The control arrangement incorporates several meters for measuring the temperatures and flow volumes, and a control unit 26 receiving the measured data, as will be explained more closely hereinafter. The control arrangement further includes several valves with actuators, which are controlled by the control unit.

The arrangement operates in such a way that the pump 3 circulates a heat transfer fluid through the pipeline system 4 and heat exchangers 1, 2. Under partial load conditions, the performance of the arrangement can be controlled by conducting part of the fluid flow by means of the three-way valve 5 past heat exchanger 1 or reducing the total fluid flow circulating in the arrangement by returning part of the fluid flow of the pump 3 directly from the delivery side to the suction side via a valve 6.

When the power of the heat exchangers 1, 2 is insufficient for maintaining the desired temperature 10' for the supply air, a valve 24 leading to the heat source 8 or a valve 25 leading to the cooling source 9 is opened as needed. The amount of cooling or heating fluid supplied to the circulation pipeline system 4 is controlled with a three-way valve 7. Valves 24, 25 can naturally also be used directly for control.

For control purposes, the temperatures 14', 15', 16', 17' are measured by thermostats 14, 15, 16, 17 at both sides of the heat exchangers 1, 2, and the temperature 18' of the fluid supplying additional energy is measured by thermostat 18. Further, the fluid flow 19' circulating in the pipeline system 4 is measured by meter 19, the fluid flow 20' bypassing the heat exchanger 1 by meter 20 and the fluid flow 21' supplying additional energy by meter 21.

The measured values are applied to control unit 26 which calculates the energy flows passing in the different sections of the arrangement and the energy flows supplied to the arrangement and withdrawn therefrom on the basis of the fluid flows and temperatures, and optimizes the operation in response to them.

The control unit controls the operation of the valves 5, 6, 7 by means of control signals 7', 22', 23' with servomotors 22, 23, 27 in such a way that the additional energy flow supplied through valve 7 reaches its minimum value. The processing of the control signals can be based on pre-programmed algorithms or logic functions of the control unit.

Measuring of the fluid flows 21' and 20' and the temperature 18' is not indispensable, but facilitates the formation of algorithms considerably and eliminates unnecessary delays in the feedback of the control. By means of the fluid flow 21' and the temperature 18', it is also easy to define operations for the limitation of the use of energy.

The temperature values 11', 12', 13' measured by the thermostats 11, 12, 13 are not indispensable for the actual control, but enable forming of various anticipatory and limiting functions and operations that can pertain to temperature drifts 11' and/or 12', derivative control of the effect of condensing 10' and 11' or 12' and 13', etc.

The control can naturally be implemented the other way round, so that air temperatures 10', 11', 12', 13' and air flows, for example, are employed as measured variables, whilst the fluid temperatures 14', 15', 16', 17', 18' and fluid flows 19', 20', 21' are employed as correction variables and auxiliary variables. What is essential is that the control is based on regulating energy flows and their ratios and on minimizing the amount of additional energy supplied.

The invention has been explained in the above with reference to the embodiment of FIG. 2. It relates generally to heat transfer in ventilation and air conditioning. In the case of FIG. 1, for example, the energy supplied to the additional heating radiator 8 would be the quantity to be minimized.

The invention can be implemented in all heat recovery arrangements based on fluid circulation, and to a limited extent also in other arrangements.

The invention can also be implemented in a simpler manner than what is illustrated in FIG. 2, for example by omitting the meters 18, 21 for the fluid flow and temperature of additional energy, reducing the number of measuring points for the air temperature 11, 12, 13 or the fluid flow 20, 21. This presupposes that calculation of these variables has been programmed or tabulated into the control unit. On the other hand, operations known per se can be added; e.g. compensation of the control value 10' of supply air on the basis of the outdoor temperature or room temperature can be added, thawing of heat exchanger 2 can be added to the operation of the valve 5 and/or pump 3, etc. What is essential is that the arrangement includes equipment and operations necessary for measuring and controlling the energy flows circulating in the arrangement or supplied thereto. All of these are naturally included within the scope of the invention.

The drawing and the description relating thereto are only intended to illustrate the inventive concept. In their details the method and arrangement of the invention can vary considerably within the scope of the claims.

We claim:

1. A method for controlling the transfer in a ventilation apparatus or an air conditioning apparatus, comprising
    transferring heat contained in exhaust air into supply air by means of a heat transfer circuit which includes fluid circulation,
    supplying additional heating or additional cooling energy to the fluid of the heat transfer circuit when the heat transferred from the exhaust air is insufficient for maintaining a predetermined temperature of the supply air,
    measuring temperature and fluid flow rate in the heat transfer circuit,
    measuring energy flow rate from the supply of additional heating or cooling energy, and
    controlling the supply of additional heating or additional cooling energy in response to measured temperatures and fluid flow rates of the heat transfer fluid and of the additional energy for minimizing the additional energy supplied.

2. A method according to claim 1 wherein the measuring steps comprise measuring the temperature of the heat transfer fluid at both sides of a heat exchanger for supply air and a heat exchanger for exhaust air and measuring the temperature of a fluid supplying the additional energy and measuring the fluid flow circulating in the heat transfer circuit, measuring the fluid flow bypassing the heat exchanger for supply air and measuring the fluid flow supplying additional energy.

3. A control arrangement for a ventilation apparatus or an air conditioning apparatus, comprising a heat recovery circuit comprising
    heat exchangers in supply and exhaust air flows, and a heat transfer fluid flow therebetween,
    a supply circuit for additional heating and cooling energy, connectable by fluid flow with the heat recovery circuit,
    apparatus for controlling the supply of additional energy,
    measuring apparatus for measuring the temperatures and fluid flows of the heat transfer fluid and of the additional energy, and
    control apparatus responsive to the measured temperatures and flow rates for controlling the supply of additional energy to minimize the additional energy supplied.

4. A control arrangement as claimed in claim 3, comprising means for controlling the flow of fluid circulating in the heat transfer circuit.

5. A control arrangement as claimed in claim 3 comprising means for measuring the temperature of the heat transfer fluid at both sides of the heat exchanger for supply air and the heat exchanger for exhaust air and means for measuring the temperature of fluid supplying additional energy and means for measuring fluid flow circulating in the heat recovery circuit, means for measuring fluid flow bypassing the heat exchanger for supply air and means for measuring fluid flow supplying additional energy.

6. A control arrangement as claimed in claim 3 comprising a circulation pump in the heat recovery circuit having a controllable pump rate.

7. A control arrangement as claimed in claim 3 wherein the control apparatus is adapted to control the supply of additional energy in such a way that the temperature of the supply air slides within an operational range in which the amount of additional energy is limited.

8. A control arrangement as claimed in claim 7, wherein the control apparatus is adapted to limit the supply air flow within an operational range in which the amount of additional energy is limited.

9. A control arrangement as claimed in claim 3, wherein the control apparatus is adapted to operate in such a way that when the air conditioning apparatus is cooling, dehumidification of air is prevented or limited by adjusting air flow of the apparatus in response to energy consumption.

10. A control arrangement as claimed in claim 4 comprising means for measuring the temperature of the heat transfer fluid at both sides of the heat exchanger for supply air and the heat exchanger for exhaust air and means for measuring the temperature of fluid supplying additional energy and means for measuring fluid flow circulating in the heat recovery circuit, means for measuring fluid flow bypassing the heat exchanger for supply air and means for measuring fluid flow supplying additional energy.

11. A control arrangement as claimed in claim 4 comprising a circulation pump in the heat recovery circuit having a controllable pump rate.

12. A control arrangement as claimed in claim 4 wherein the control apparatus is adapted to control the supply of additional energy in such a way that the temperature of the supply air slides within an operational range in which the amount of additional energy is limited.

13. A control arrangement as claimed in claim 12, wherein the control apparatus is adapted to limit the supply air flow within an operational range in which the amount of additional energy is limited.

* * * * *